United States Patent Office 2,961,104
Patented Nov. 22, 1960

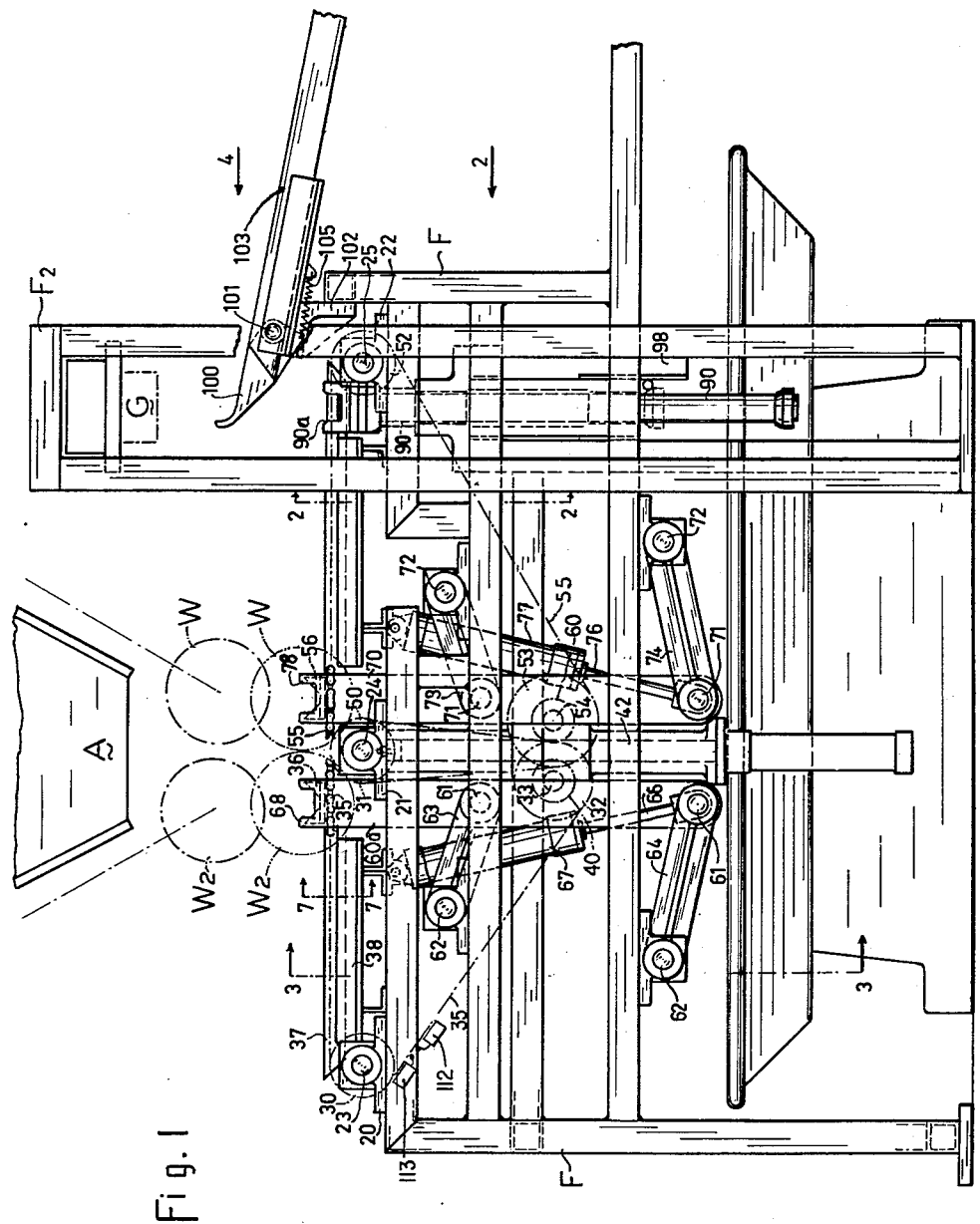

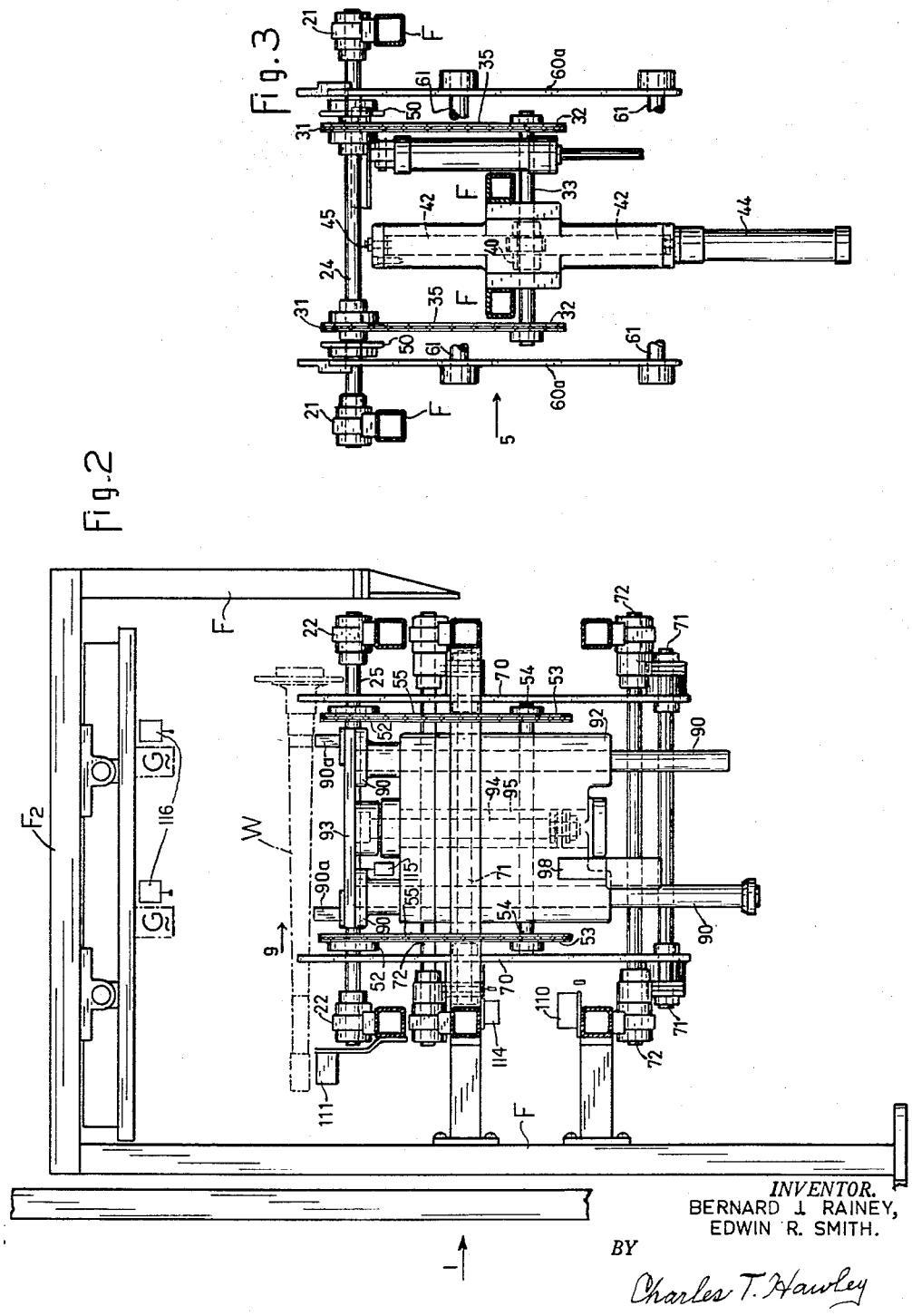

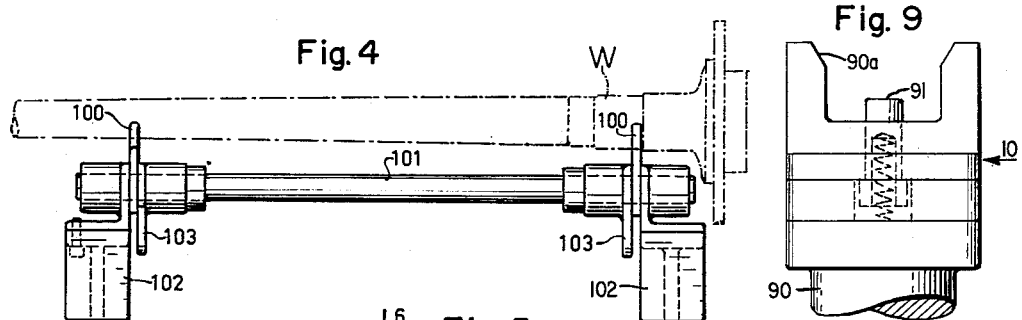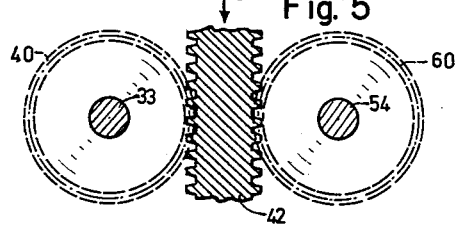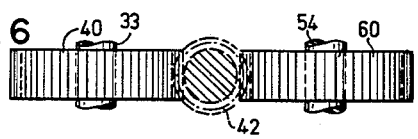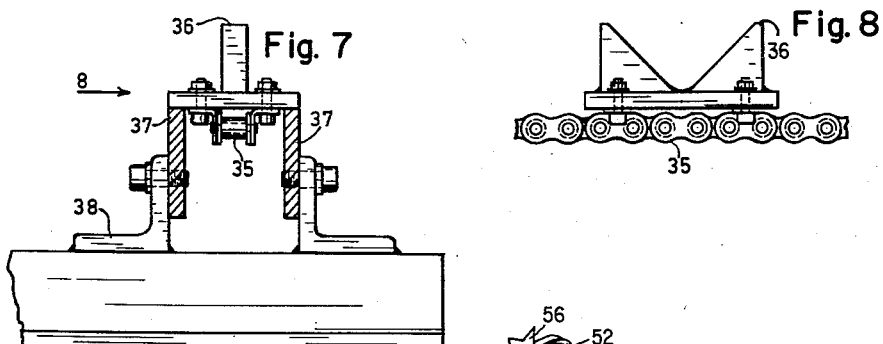
Fig. 4, Fig. 5, Fig. 6, Fig. 7, Fig. 8, Fig. 9, Fig. 10, Fig. 11
INVENTOR.
BERNARD J. RAINEY,
EDWIN R. SMITH.
Charles T. Fawley
ATT'Y.

2,961,104

APPARATUS FOR DISCHARGE AND REPLENISHMENT OF AUTOMATIC UNLOADING AND RELOADING MECHANISM

Bernard J. Rainey, Waterloo, and Edwin R. Smith, Seneca Falls, N.Y., assignors to Seneca Falls Machine Company, Seneca Falls, N.Y., a corporation of Massachusetts Filed Oct. 9, 1956, Ser. No. 614,934

2 Claims. (Cl. 214—1)

This invention relates to automatic unloading and reloading mechanism for use with lathes or other similar machine tools.

It is the general object of this invention to provide improved apparatus for removing and discharging a finished workpiece from such automatic unloading mechanism and for supplying a new and unfinished workpiece to the associated automatic loading mechanism.

A further feature of the invention relates to the provision of means for automatically gauging the finished workpiece prior to final discharge, and for preventing such discharge if the workpiece is indicated to be oversize.

The invention further relates to arrangements and combinations of parts which will be hereinafter described and more particularly pointed out in the appended claims.

A preferred form of the invention is shown in the drawings, in which:

Fig. 1 is a side elevation of the improved discharge and replenishing apparatus;

Fig. 2 is a right-hand end elevation, looking in the direction of the arrow 2 in Fig. 1;

Fig. 3 is a partial left-hand sectional end elevation, taken generally along the line 3—3 in Fig. 1;

Fig. 4 is a detail right-hand elevation of certain parts, looking in the direction of the arrow 4 in Fig. 1;

Fig. 5 is a partial detail view of a gear drive, looking in the general direction of the arrow 5 in Fig. 3;

Fig. 6 is a sectional plan view, looking the direction of the arrow 6 in Fig. 5;

Fig. 7 is a detail left-hand sectional elevation, taken along the line 7—7 in Fig. 1;

Fig. 8 is a side elevation of certain parts, looking in the direction of the arrow 8 in Fig. 7;

Fig. 9 is a partial detail view of an elevating device, looking in the direction of the arrow 9 in Fig. 2;

Fig. 10 is a side elevation thereof, looking in the direction of the arrow 10 in Fig. 9; and Fig. 11 is a partial assembly view to be described.

Referring particularly to Fig. 1, this improved discharge and replenishing apparatus is shown in connection with an unloading and reloading mechanism which is indicated generally at A and which is adapted to deliver a finished workpiece W above the discharge part of this apparatus, and to receive a new and unfinished workpiece W2 from the replenishing portion of the apparatus.

The unloading and reloading mechanism A is illustrative only and may be of the general construction shown in the prior patent to Dinsmore and Smith, No. 2,714,324 issued August 2, 1955.

The utility of the present apparatus is not limited, however, to use with any particular type of unloading and reloading apparatus.

This improved apparatus comprises a rigid tubular frame-work F (Fig. 1) supporting bearing blocks 20, 21 and 22. Shafts 23, 24 and 25 are freely rotatable in these bearing blocks. Spaced sprockets 30 are mounted on the shaft 23 and sprockets 31 (Figs. 1 and 3) are mounted on the shaft 24.

An additional sprocket 32 (Fig. 1) is mounted on a lower or driving shaft 33. Each set of sprockets 30, 31 and 32 supports a sprocket chain 35 which carries a cradle 36 (Figs. 7 and 8). These cradles in their upper run slide along fixed guide-plates 37 (Figs. 1 and 7) mounted on angle-iron bracket 38.

The lower sprockets 32 (Figs. 1 and 3) are keyed to the drive shaft 33, which in turn is provided with a gear 40 (Figs. 5 and 6) which is engaged by rack teeth on one side portion of a circular rack bar 42 (Figs. 1 and 3). The circular rack bar 42 is connected to a piston in an operating cylinder 44 (Fig. 3) and will be raised as air is admitted to the cylinder 44. An adjustable stop-screw 45 (Fig. 3) determines the upper limit of travel of the rack bar 42 and thus coacts to control the outer travel of the sprocket chains 35 (Fig. 1).

Spaced sprockets 50 (Fig. 3) are freely mounted on the shaft 24 outside of the sprockets 31, and the sprockets 50 coact with sprockets 52 (Fig. 1) on the shaft 25 and with sprockets 53 on a lower shaft 54 (Fig. 2) to support and drive a second pair of drive chains 55 (Fig. 1) which carry cradles or V-blocks 56 adapted to receive a finished workpiece W discharged from the loading mechanism A.

The lower shaft 54 (Figs. 5 and 6) has a gear 60 (Fig. 5) fixed near the middle of its length and engaging a second set of rack teeth on the rack bar 42 previously described.

The two sets of chains 35 and 55 are thus simultaneously and alternately moved toward or away from each other, and the larger diameter of the sprockets 53 relative to the sprockets 32 provides increased travel for the chains 55. The coaction of the driving parts is clearly disclosed in Fig. 11.

A pair of upright transfer bars or members 60a (Fig. 1) are mounted on shafts 61 and 62 connected by substantially parallel swinging links 63 and 64. The lower cross shaft 61 is connected to a piston rod 66 associated with an operating cylinder 67.

The upper end of each member 60a is recessed as indicated at 68. When the transfer members 60 are lifted, they take the new workpiece W2 from the cradles 36 on the chains 35 and raise the new workpiece W2 to the upper position indicated in Fig. 1, where it will be grasped by grippers (not shown) which form part of the loading mechanism A. Such grippers are fully disclosed in the prior Dinsmore and Smith patent above identified.

Similar upright transfer bars or members 70 (Fig. 1) are mounted on shafts 71 and 72 connected by parallel upper and lower swinging arms 73 and 74 (Fig. 1). The lower cross shaft 71 is also connected to a piston rod 76 associated with an operating cylinder 77.

It will be noted that both cylinders 67 and 77 are pivotally mounted at their upper ends, so that limited swinging movement is available.

When air is admitted to the cylinder 77, the transfer members 70 are raised to engage a finished workpiece W held by the grippers of the mechanism A. Recesses 78 at the upper ends of the transfer members 70 receive the workpiece W. The transfer members 70 are then lowered to deposit the workpiece W in the cradles or V-blocks 56 on the chains 55. As the chains move outward, the finished workpiece W is presented to a rear set of transfer members 90 (Fig. 1) having recessed upper end portions 90a. The spring plungers 91 in the upper ends of the transfer members 90 (Figs. 9 and 10) are provided to cushion the workpiece as it contacts a positive stop on the gauge G as it is raised by the air-operated cylinder 95.

The rear transfer members 90 are vertically slidable in a fixed stand or bracket 92 (Fig. 2) and are connected at their upper ends to a cross bar 93, which in turn is connected to a piston rod 94 in an operating cylinder 95.

When air is admitted to the cylinder 95, the recessed upper end portions 90a (Figs. 9 and 10) of the transfer members 90 will engage the finished workpiece W and will lift it upward to engage snap rings or other standard gauging devices G carried by a fixed upper frame structure F2. These gauging devices G may be of any standard type and in themselves form no part of this invention.

A limit switch 98 (Figs. 1 and 2) engages one of the transfer members 90 and prevents further operation of the machine if the workpiece W cannot enter the gauge G. If, however, the workpiece is of correct size and enters the gauge, the switch 98 then permits reverse and downward movement of the transfer members 90.

As the workpiece W descends, it is engaged by latches 100 (Fig. 4) mounted on a cross-shaft 101 supported in fixed bearings 102. The workpiece is then released and discharged along fixed inclined guide-plates 103. Springs 105 permit the latches to be moved yieldingly upward as a workpiece W is raised for gauging.

Additional limit switches, as 110 to 116 (Fig. 2), are provided to coordinate successive operations of the apparatus and to stop the apparatus on failure of completion of any previous operation.

Improved and effective apparatus is thus provided for automatically reloading the carriage loading mechanism with a new workpiece, and for automatically unloading, gauging and discharging a finished workpiece presented by the carriage unloading and transporting mechanism. Use of the gauging devices is of course optional.

Having thus described our invention and the advantages thereof, we do not wish to be limited to the details herein disclosed, otherwise than as set forth in the claims, but what we claim is:

1. An unloading and replenishing apparatus for a machine tool comprising a loading conveyor effective to present a new workpiece in position for transfer to said machine tool, an unloading conveyor effective to remove a finished workpiece from said machine tool, means to cause said loading and unloading conveyors to advance simultaneously toward each other and to thereafter move simultaneously away from each other, said apparatus being thereby effective to advance one workpiece towards operative position in said machine tool as said conveyors approach, and to remove a prior workpiece from said machine tool as said conveyors separate, said conveyors comprising aligned pairs of parallel chains carrying work-supporting blocks, means to move said pairs of chains simultaneously but in opposite directions, and the chain-moving means comprising an air-operated and axially-movable double rack and coacting pinions which move said pairs of chains simultaneously toward and thereafter away from each other.

2. The combination in an unloading and replenishing apparatus as set forth in claim 1, in which means is provided to move the work-supporting blocks on the unloading conveyor faster and further than the work-supporting blocks on the loading conveyor.

References Cited in the file of this patent

UNITED STATES PATENTS

| | | |
|---|---|---|
| 1,976,855 | McKee | Oct. 16, 1934 |
| 2,327,629 | Fedorchak | Aug. 24, 1943 |
| 2,371,748 | Fedorchak | Mar. 20, 1945 |
| 2,506,425 | Journeaux | May 2, 1950 |
| 2,579,688 | McCormick | Dec. 25, 1951 |
| 2,597,415 | Watson | May 20, 1952 |
| 2,674,093 | Slomer | Apr. 6, 1954 |
| 2,746,613 | Meyer | May 22, 1956 |
| 2,813,381 | Narel | Nov. 19, 1957 |